United States Patent [19]
Saito

[11] Patent Number: 5,937,403
[45] Date of Patent: Aug. 10, 1999

[54] INTEGER PERMUTATION METHOD AND INTEGER PERMUTATION SYSTEM

[75] Inventor: Akitoshi Saito, Hamamatsu, Japan

[73] Assignee: Yamaha Corporation, Shizuoka-ken, Japan

[21] Appl. No.: 08/694,337

[22] Filed: Aug. 8, 1996

[30] Foreign Application Priority Data

Aug. 11, 1995 [JP] Japan .................................. 7-206049

[51] Int. Cl.⁶ .................................................. G06F 17/30
[52] U.S. Cl. .............................................. 707/7; 711/200
[58] Field of Search ............................... 707/7; 364/700; 711/200

[56] References Cited

U.S. PATENT DOCUMENTS

| | | | |
|---|---|---|---|
| 4,809,158 | 2/1989 | McCauley | 707/7 |
| 5,396,622 | 3/1995 | Lee et al. | 707/7 |
| 5,414,842 | 5/1995 | Archer et al. | 707/7 |
| 5,440,734 | 8/1995 | Wagar | 707/7 |
| 5,487,164 | 1/1996 | Kirchofer et al. | 707/7 |
| 5,490,269 | 2/1996 | Cohn et al. | 707/7 |
| 5,678,043 | 10/1997 | Ng et al. | 70/101 |
| 5,873,087 | 2/1999 | Angle et al. | 707/102 |

*Primary Examiner*—Wayne Amsbury
*Attorney, Agent, or Firm*—Hazel & Thomas, P.C.

[57] ABSTRACT

Integer permutation is performed while a data sequence is transferred between buffers 1 and 2 alternately. Each data piece is divided into four elements and integer permutation is executed with the elements as keys from low-order to high-order elements. In the integer permutation, the data pieces are stored in the storage areas in the buffers in pack relation. To enable this, for each value of each element, a dividing analysis section 10 preliminarily surveys the number of data pieces having the element of such a value, and initializes pointers for specifying areas into which data pieces having the elements of each value are to be written. A digit place setting section 21, a digit place sort section 22, a switch circuit 30, and switches SW1 and SW2 determine the value of the corresponding element of data read from the buffer and guide the pointer required for data write to an address terminal of the buffer from the dividing analysis section 10.

4 Claims, 6 Drawing Sheets

FIRST BUFFER
↳ TO DISTRIBUTION

FIG. 4 (b)

INITIAL VALUE OF POINTER

FIG. 4 (c)

SECOND BUFFER     DISTRIBUTION

FIG. 5 (a)

SECOND BUFFER

↳ TO DISTRIBUTION

FIG. 5 (b)

INITIAL VALUE OF POINTER

FIG. 5 (c)

FIRST BUFFER     DISTRIBUTION

INTEGER PERMUTATION METHOD AND INTEGER PERMUTATION SYSTEM

BACKGROUND OF THE INVENTION

1. Field of the Invention

The present invention relates to an integer permutation method and an integer permutation system for permuting a data sequence in the magnitude order of data.

2. Related Art

Figure 6:
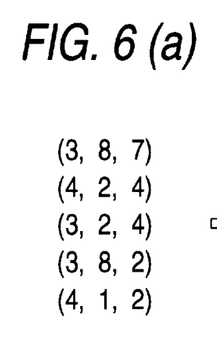
FIGS. 6(a)–6(d) illustrate the steps of the general radix sorting method as known in the prior art.

A method called radix sort is known as sort processing for permuting data in the magnitude order (permutation processing). Here, the radix sort method will be discussed by taking integer permutation of 3-digit integer data as an example with reference to FIG. 6. First, as shown in FIG. 6(a), the integer data to be sorted is disassembled into elements at hundreds, tens, and units. Next, attention is focused on the units and the data is permuted so that the values of the elements at the units are arranged in the ascending magnitude order, as shown in FIG. 6(b). For the data sequence after the permutation is executed, then the data is permuted so that the values of the elements at the tens are arranged in the ascending magnitude order, as shown in FIG. 6(c). Last, the data is permuted so that the values of the elements at the hundreds are arranged in the ascending magnitude order, as shown in FIG. 6(d). Integer permutation for each digit place is executed in sequence from the low-order place to the high-order place, thereby finally providing an integer data sequence resulting from integer permutation in the ascending magnitude order of the integer data.

To execute the radix sort method by hardware, generally two buffers (first and second buffers) are used as described below:

First, the integer data sequence to be sorted is once stored in the first buffer. The integer data in the first buffer is read in sequence and written into storage areas in the second buffer. The storage areas into which the integer data is written are determined based on the values of the elements at units of the integer data. That is, the integer data is distributed in sequence to the storage areas in the second buffer in such a manner that the integer data whose element at units is 0 is written into the top storage area in the second buffer, that the integer data whose element at units is 1 is written into the next storage area, . . . , and that the integer data whose element at units is 9 is written into the last storage area. As a result of the processing, an integer data sequence undergoing integer permutation at units is provided in the second buffer.

Next, the integer data is read in sequence starting at the top storage area in the second buffer and written into the storage areas in the first buffer. In this case, the storage areas into which the integer data is written are determined based on the values of the elements at tens of the integer data. After the processing is performed, an integer data sequence undergoing integer permutation at tens is provided in the first buffer. Last, the integer data is read in sequence starting at the top storage area in the first buffer and written into the storage areas in the second buffer corresponding to the values of the elements at hundreds of the integer data. An integer data sequence undergoing integer permutation is now provided in the second buffer.

However, if such a method is adopted, storage areas into which all integer data pieces can be written for each element need to be provided because the values of the elements of all integer data can equal in the worst case. Therefore, assuming that the number of integer data pieces is N, that the number of elements making up each integer data piece is M, and that the number of types of values that each element can take is P, the number of storage areas required in the first and second buffers is N×P (=N×P×Mlog$_2$P bits). Thus, if the conventional integer permutation method is attempted to be executed by hardware, buffers of extremely large capacities become necessary depending on the integer permutation processing contents.

SUMMARY OF THE INVENTION

It is therefore an object of the invention to provide an integer permutation method and an integer permutation system not requiring large-capacity storage means and being capable of executing integer permutation processing of a large number of data pieces at high speed.

According to the present invention, there is provided an integer permutation method for performing integer permutation of a plurality of data pieces each consisting of a plurality of elements, the method comprising the steps of:

a. executing an input process of storing the data pieces in storage means;

b. by determining element values in the data pieces for each element, in a data sequence which will result from performing integer permutation of the data pieces with elements as keys, finding addresses of top data pieces of data pieces having the corresponding element of each value for each value and setting the addresses as initial values of pointers each provided corresponding to each value of the corresponding element;

c. selecting the elements in order from low-order to high-order elements, and for each of the elements selected in order, executing:

c1. a process of reading the data pieces in sequence from the storage means;

c2. a process of determining the value of the corresponding element in the data pieces and storing each data piece in a storage area in the storage means addressed by the pointer corresponding to the value; and c3. a process of incrementing the pointer used for addressing the data piece.

According to the other aspect of the invention, there is provided an integer permutation method for performing integer permutation of a plurality of data pieces each consisting of a plurality of elements, the method comprising the steps of:

a. executing an input process of storing the data pieces in storage means;

b. determining element values in the data pieces for each element, totalizing the number of data pieces having the corresponding element of the corresponding value for each value of the corresponding element, in a data sequence which will result from performing integer permutation of the data pieces with the elements as keys, finding addresses of top data pieces of data pieces having the corresponding element of each value for each value based on the totalization result, and setting the addresses as initial values of pointers each provided corresponding to each value of the corresponding element;

c. selecting the elements in order from low-order to high-order elements, and for each of the elements selected in order, executing:

c1. a process of reading the data pieces in sequence from the storage means;

c2. a process of determining the value of the corresponding element in the data pieces and storing each data piece in a storage area in the storage means addressed by the pointer corresponding to the value; and c3. a process of incrementing the pointer used for addressing the data piece.

According to still the other aspect of the invention, there is provided an integer permutation system for performing integer permutation of a plurality of data pieces each consisting of a plurality of elements, the system comprising:

means for storing the data pieces;

dividing means for determining element values in the data pieces for each element;

a plurality of pointers each provided for each value of each element;

dividing analysis means, by determining element values in the data pieces for each element, in a data sequence which will result from performing integer permutation of the data pieces with elements as keys, for finding addresses of top data pieces of data pieces having the corresponding element of each value for each value and setting the addresses in the pointers each corresponding to each value of the corresponding element as initial values; and integer permutation means for selecting the elements in order from low-order to high-order elements, and for each of the elements selected in order, executing:

a process of reading the data pieces in sequence from the storage means;

a process of determining the value of the corresponding element in the data pieces and storing each data piece in a storage area in the storage means specified by the pointer corresponding to the value; and a process of incrementing the pointer used for specification of the storage area of the data piece.

In still the other aspect the invention, in the integer permutation system, the storage means is made up of first and second buffers, and the integer permutation means executes the processes while transferring the data pieces between the first and second buffers alternately.

According to the present invention, for a plurality of data pieces, integer permutation is performed with elements as keys from low-order to high-order elements, and a data sequence of data pieces integer-permuted in the ascending magnitude order of the data pieces is finally provided. The integer permutation with elements as keys is executed by reading data pieces from the storage means and relocating them in storage areas in the storage means. At the time, each data piece is written into the storage area corresponding to the value of the corresponding element of the data piece, of the storage areas previously allocated for each value of the corresponding element. That is, before the integer permutation, the values of the elements making up each of the data pieces are determined, and in a data sequence which will result from performing integer permutation of the data pieces with elements as keys, the addresses of top data pieces of data pieces having the corresponding element of each value are found for each value and are set as the initial values of the pointers each provided corresponding to each value of the corresponding element. When integer permutation with each element as a key is performed, the value of the corresponding element of data read from the storage means is determined, the pointer corresponding to the value of the element of the determination result is referenced, and the data piece is written into the storage area addressed by the pointer. Then, the pointer is incremented. According to the invention, since integer permutation is executed according to such procedures, when integer permutation with elements as keys is performed, data pieces to be processed can be stored in the storage areas of the storage means in pack relation. Therefore, integer permutation of a large number of data pieces can be executed without using large-capacity storage means.

In the invention, the pointers are initialized by determining the element values in the data pieces for each element. The invention provides one form of a specific procedure. That is, in the invention, for each value of each element, the number of data pieces having the corresponding element of the corresponding value is totalized and the address to be set in the pointer as an initial value is calculated based on the totalization result.

The invention also relates to an integer permutation system. According to the invention, the integer permutation method can be carried out by a minimum required configuration.

In the invention, two buffers are used as the storage means and integer permutation is executed while data pieces to be processed are transferred from one buffer to the other and from the other to the one alternately. From the viewpoint of simplifying the circuit configuration for access control to the storage means, it is effective to use two buffers in such a manner.

BRIEF DESCRIPTION OF THE DRAWINGS

FIG. 4(c) shows a memory map illustrating the incrementing of the pointer relative to the first buffer in connection with the integer permutation processing with a second element as a key shown in FIG. 5(a)

DESCRIPTION OF THE PREFERRED EMBODIMENTS

An embodiment of the invention will be discussed for furthermore easy understanding of the invention. It shows one form of the invention; it does not limit the invention and can be changed as desired within the scope of the invention.

Figure 1:
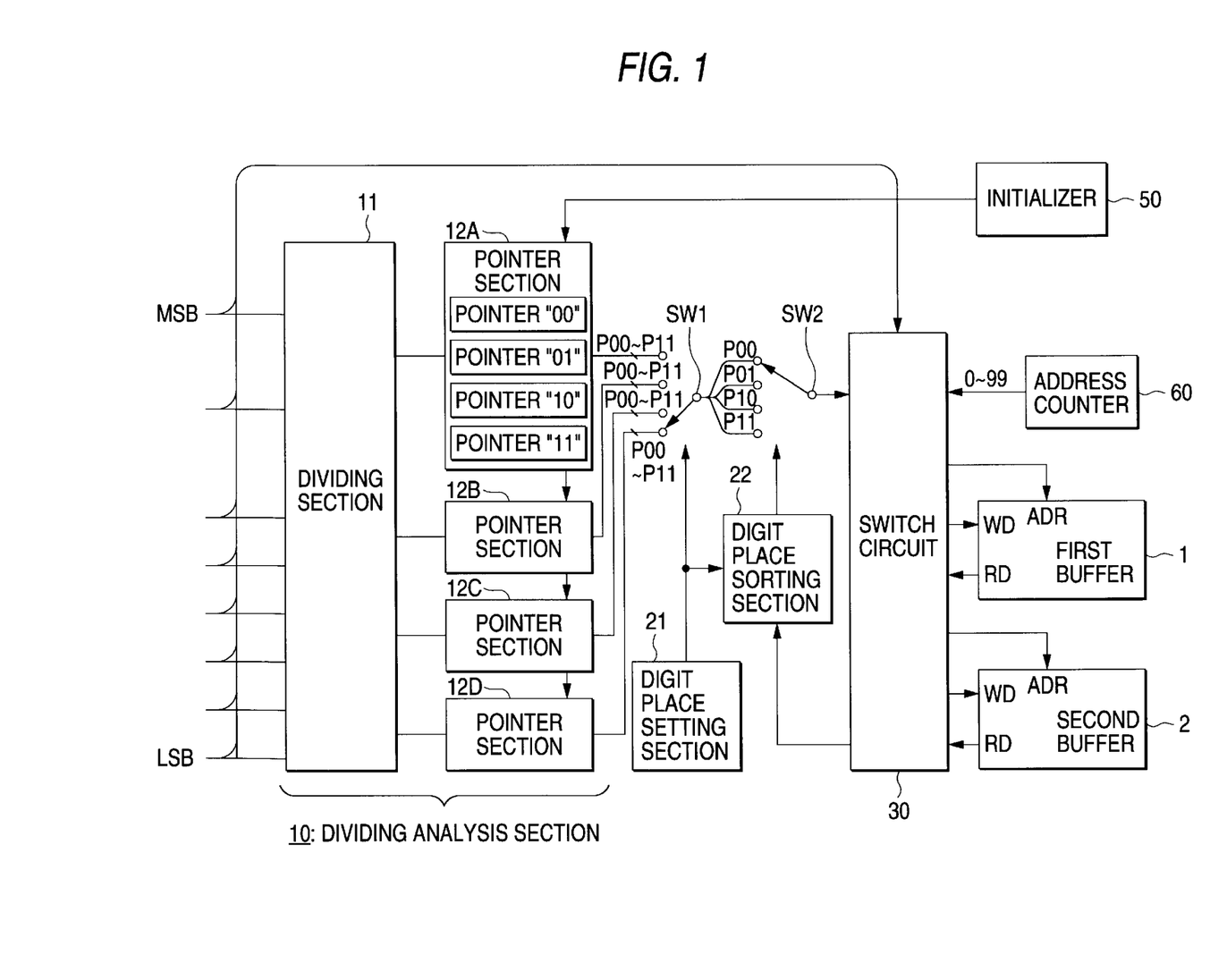
FIG. 1 is a block diagram to show the configuration of an integer permutation system according to one embodiment of the invention.

FIG. 1 is a block diagram to show the configuration of an integer permutation system according to one embodiment of the invention. The integer permutation system receives 100 8-bit data pieces and integer-permutes the data in the ascending magnitude order. The configuration of the system will be discussed with reference to FIG. 1.

First, in FIG. 1, numeral 1 is a first buffer and numeral 2 is a second buffer. These buffers are used to store an 8-bit data sequence to which integer permutation processing is applied. In the embodiment, basically integer permutation is executed in accordance with the radix sort method; more specifically, each data piece to which integer permutation processing is applied is divided into the first element consisting of the least significant bit (LSB) or the zeroth bit and the first bit, the second element consisting of the second and third bits, the third element consisting of the fourth and fifth bits, and the fourth element consisting of the sixth bit and the most significant bit (MSB) or the seventh bit, and integer permutation with each element as a key is applied to the data sequence to be processed in the order of the first element, second element, third element, and fourth element. It is executed by moving the data to be processed alternately from one of the first and second buffers 1 and 2 to the other and from the other to one.

In the embodiment, to perform integer permutation with the elements as keys, the data pieces to be processed are stored in the storage areas in the first buffer 1 or second buffer 2 in pack relation. To enable such integer permutation, for each value of the corresponding element, the number of data pieces having the corresponding element of such a value is preliminarily surveyed in the embodiment. When integer permutation is executed, the initial value of a write address for writing data into the second buffer 2 (first buffer 1) is found for each value of each element based on the result of the preliminary survey. In the embodiment, processing of finding the initial values of the write addresses and processing of reading a data string to be sorted are collectively called initialization processing. In actual integer permutation, data write address control is performed according to the initial values of the write addresses previously found in the initialization processing.

A dividing analysis section 10 in FIG. 10 is means for executing management of write addresses in the initialization processing and integer permutation, and consists of a dividing section 11 and pointer sections 12A–12D. The dividing section 11 is a circuit for dividing an 8-bit input data piece into the first to fourth elements and determining which of "00," "01," "10," and "11" each of the elements is. The pointer sections 12A–12D are circuits provided in a one-to-one correspondence with the first to fourth elements, each pointer section for outputting four pointers P00–P11 about the corresponding element. These pointers P00–P11 are used for write address specification when data is written into the second buffer 2 (first buffer 1).

Figure 2:
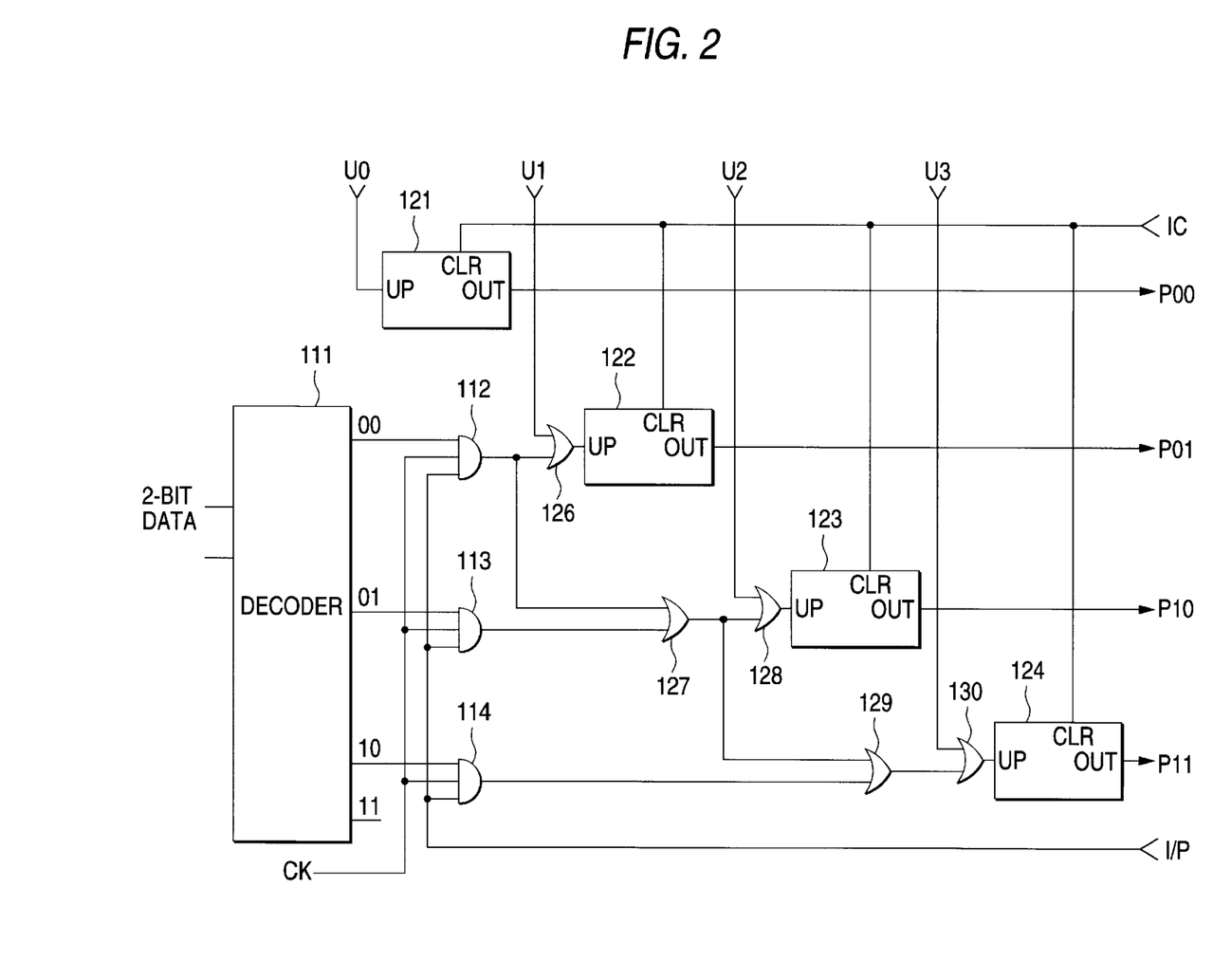
FIG. 2 is a block diagram to show a configuration example of a portion corresponding to one element in a dividing analysis section in the embodiment.

FIG. 2 is a block diagram to show a configuration example of a portion corresponding to one element in the dividing analysis section 10. In the figure, a decoder 111 and AND gates 112–114 are parts corresponding to the dividing section 11 in FIG. 1. The decoder 111 determines which of "00," "01," "10," and "11" the value of one of four elements into which the data to be processed is divided (2-bit data) is. If the element is "00" as a result of the determination, signal "1" is given to the AND gate 112; if the element is "01," signal "1" is given to the AND gate 113; if the element is "10," signal "1" is given to the AND gate 114. Data input clock CK and operation change signal I/P are input to each of the AND gates 112–114. The data input clock CK is a clock given in synchronization with the event each time one data piece to be processed is input to the integer permutation system. The operation change signal I/P is a signal output by an initializer 50 in FIG. 1; it is set to "1" while initialization processing is performed, then to "0" while permutation is performed.

Next, up-counters 121–124 and OR gates 126–130 are parts corresponding to one of the pointer sections 12A–12D in FIG. 1. The counts of the up-counters 121–124 are output from output terminals OUT as the pointers P00–P11. When initialization processing is started, initial clear signal IC is supplied to a clear terminal CLR of each up-counter from the initializer 50 in FIG. 1, whereby the counts of the up-counters are initialized to "0."

Data count clocks U0–U3 are input to clock terminals UP of the up-counters 121–124, respectively, directly or via the OR gates. They are output for incrementing the pointers P00–P11 when permutation processing is performed; they are set to "0" while initialization processing of the pointers P00–P11 is performed. Therefore, in initialization processing, the output signals from the AND gates 112–114 are supplied via the OR gates 126–130 to the up-counters 122–124 for counting. Since the OR gates 126–130 are connected as shown in FIG. 2, the following initial values of the pointers P00–P11 are set in the up-counters as a result of counting of the up-counters 121–124:

Pointer P00: No counting is performed during initialization processing. Therefore, "0" is the initial value.

Pointer P01: The number of data pieces with the value of the corresponding element being "00" is set as the initial value.

Pointer P10: The number of data pieces with the value of the corresponding element being "00" or "01" is set as the initial value.

Pointer P11: The number of data pieces with the value of the corresponding element being "00," "01," or "10" is set as the initial value.

We have discussed the details of the portion corresponding to one of the first to fourth elements in the dividing analysis section 10.

Referring again to FIG. 1, the configuration of the system will be discussed. As described above, the embodiment uses the radix sort method on the basic principle and executes integer permutation with the first to fourth elements as keys in sequence. To carry out such operation, when integer permutation with each element as a key is executed, the four pointers P00–P11 corresponding to the element need to be selected. A switch SW1 and a digit place setting section 21 in FIG. 1 make up selection means for the purpose. That is, while integer permutation with the first element as a key is executed, the first element is selected by the digit place setting section 21, whereby the pointer section 12D is selected by the switch SW1. While integer permutation with the second to fourth elements as keys is executed, the second to fourth elements are selected by the digit place setting section 21, whereby the pointer sections 12C, 12B, and 12A are selected by the switch SW1.

When integer permutation is executed, it is necessary to determine the write address according to the pointer corresponding to the value of the element of the data to be transferred, of the pointers P00–P11 selected by the switch SW1 (pointers corresponding to the key element).

A digit place sort section 22 and a switch SW2 in FIG. 1 are means provided for performing such control. That is, the digit place sort section 22 determines which of "00," "01," "10," and "11" the value of the element of the data to be transferred (namely, element selected by the digit place setting section 21) is. The data to be transferred is passed to the digit place sort section 22 via a switch circuit section 30. The switch SW2 is switched according to the determination result. When the value of the element is "00," pointer P00 is selected by the switch S2. When the value of the element is "10," pointer P10 is selected by the switch S2. When the value of the element is "11," pointer P11 is selected by the switch S2. The pointer selected by the switch SW2 is used for write address specification when the data is transferred.

The pointer used thus for addressing is incremented by one in preparation for the next write. That is, if the value of the element of the transferred data is "00," data count clock U0 is output by the digit place sort section 22; if the value of the element of the transferred data is "01," data count clock U1 is output by the digit place sort section 22; if the value of the element of the transferred data is "10," data count clock U2 is output by the digit place sort section 22; or if the value of the element of the transferred data is "11," data count clock U3 is output by the digit place sort section 22. The data count clock U0, U1, U2, or U3 is sent to the pointer section of 12A–12D corresponding to the element for incrementing the corresponding pointer.

The switch circuit 30 is switch means provided for input/output control of the first and second buffers 1 and 2. The data pieces to be processed come one after another during initialization processing. The switch circuit 30 guides the data to a write data terminal WD of the first buffer 1. Also, it connects an output terminal of an address counter 60 and an address terminal ADR of the first buffer 1 during initialization processing. The address counter 60 counts data input clocks CKs during the initialization processing and outputs address data 0–99 in sequence. As a result of making such circuit connection, 100 data pieces to be processed are stored in the storage areas corresponding to addresses 0 to 99 of the first buffer 1.

Integer permutation processing with elements as keys is performed by reading data from one of the first and second buffers 1 and 2 and writing data into the other. The switch circuit 30 switches the circuit connection state around the buffers to enable such data transfer between the buffers. That is, the output terminal of the address counter 60 is connected to the address terminal ADR of the first buffer 1 or second buffer 2 from which data is read. On the other hand, the address supplied through the switch SW2 (any one of pointers P00–P11) is supplied to the address terminal ADR of the buffer into which data is written. A read data terminal RD of the buffer from which data is read and the write data terminal WD of the buffer into which data is written are connected. Such connection enables data to be transferred between the two buffers.

The transferred data, namely, the data read from the first buffer 1 or second buffer 2 is supplied via the switch circuit 30 to the digit place sort section 22.

Figure 3:
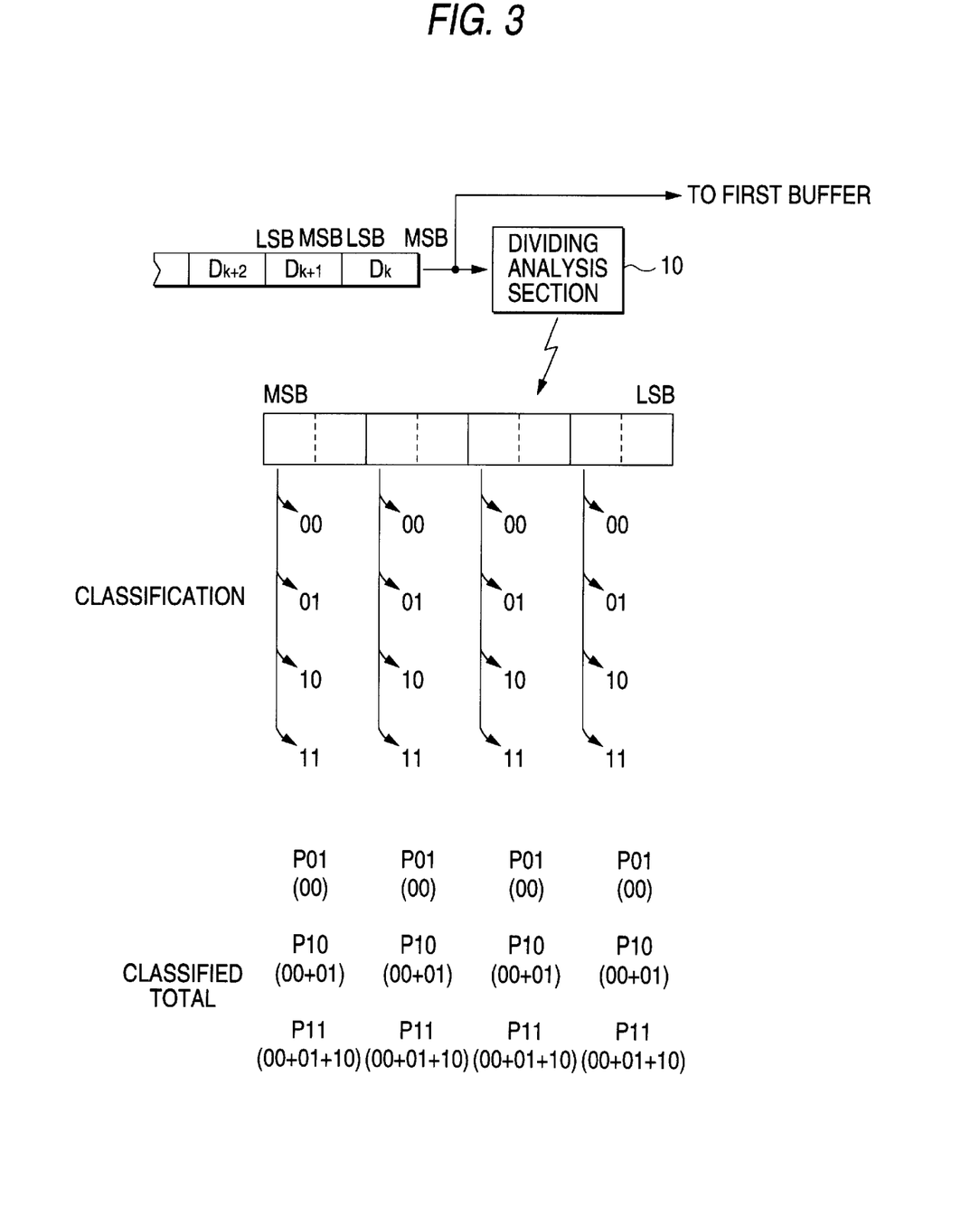
FIG. 3 is an illustration to show the contents of initialization processing in the embodiment.
Figure 4:
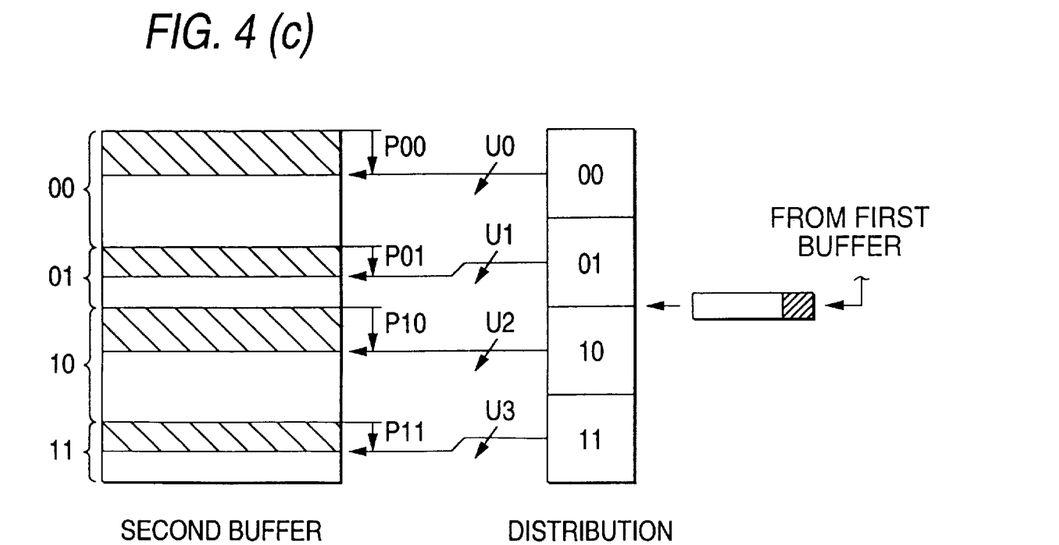
FIG. 4(a) illustrates a memory map of the first buffer in connection with the integer permutation processing having a first element as a key according to the preferred embodiment of the present invention.
FIG. 4(b) illustrates a memory map of the initial values of the pointer in connection with the integer permutation processing with a first element as a key shown in FIG. 4(a)
FIG. 4(c) shows a memory map illustrating the incrementing of the pointer relative to a second buffer in connection with the integer permutation processing with a first element as a key shown in FIG. 4(a)

FIG. 3 is an illustration to show the contents of processing performed by the dividing analysis section 10 in initialization processing. FIGS. 4 and 5 are illustrations to show the contents of integer permutation processing with elements as keys. The operation of the embodiment will be discussed with reference to the figures.

(1) Initialization Processing

For integer permutation of a data sequence, initialization processing and permutation processing with elements as keys are performed in order. In the initialization processing, data pieces coming one after another are stored in the first buffer 1 through the switch circuit 30, and are also passed to the dividing analysis section 10 for initializing the pointers P00–P11 to perform integer permutation processing with elements as keys based on the data.

That is, as shown in FIG. 3, data pieces $D_k$, $D_{k+1}$, . . . coming to the system one after another are input to the dividing analysis section 10 and the values of the first to fourth elements of each data piece are determined by the four decoders 111 in the dividing section 11. In each of the pointers 12A–12D corresponding to the first to fourth elements, if the value of the element is "00," the up-counter 122 up counts; if the value of the element is "01," the up-counters 122 and 123 up count; or if the value of the element is "10," the up-counters 122, 123, and 124 up count. The processing is performed for all data pieces $D_k$, $D_{k+1}$, . . . to be processed in the pointer sections corresponding to the first to fourth elements. Resultantly, the pointers P00–P11 are provided for the first to fourth elements.

(2) Permutation Processing with Elements as Keys

Upon completion of the initialization processing, permutation processing with elements as keys is performed in sequence. FIG. 4 shows the contents of integer permutation processing with the first element as a key executed first.

First, the first element is selected by the digit place setting section 21 and the pointer section 12D is selected by the switch SW1. Resultantly, the pointer P00–P11 corresponding to the first element is output through the switch SW1. FIG. 4(b) illustrates the pointers P00–P11. The switch circuit 30 connects the output terminal of the address counter 60 to the address terminal ADR of the first buffer 1, the read data terminal RD of the first buffer 1 to the write data terminal WD of the second buffer 2, and the switch SW2 to the address terminal ADR of the second buffer 2. In such a connection state, integer permutation processing with the first element as a key is executed.

In the integer permutation processing, the address counter 60 up counts, address data pieces 0–99 are given to the address terminal ADR of the first buffer 1 in sequence, and the data pieces in the storage areas of addresses 0–99 of the buffer are read in sequence (FIG. 4(a)). The read data pieces are given through the switch circuit 30 to the digit place sort section 22 and the write data terminal WD of the second buffer 2 in sequence.

The digit place sort section 22 determines the value of the first element of the data read from the first buffer 1 (FIG. 4(a)) and switches the SW2 according to the determination result. For example, when the value of the first element of the data is "00," the pointer P00 is selected by the switch SW2 and is given through the switch circuit 30 to the address terminal ADR of the second buffer 2. Resultantly, the data given to the write data terminal WD of the second buffer 2 at the point in time is written into the storage area addressed by the pointer P00.

As the pointer P00 is used for the addressing, the data count signal U0 is output by the digit place sort section 22 and is given to the pointer section 12D. Resultantly, the pointer P00 is incremented by one (FIG. 4(c)).

If the value of the first element of the data read from the first buffer 1 is any other value than "00," likewise the data is written into the storage area addressed by the pointer corresponding to the value and the value of the pointer is incremented by one.

The processing is executed for 100 data pieces in the first buffer 1 and a data sequence resulting from performing the integer permutation with the first elements as keys is provided in the storage areas of addresses 0–99 in the second buffer 2.

Next, integer permutation processing with the second element as a key is executed. FIG. 5 shows the contents of the integer permutation processing.

Figures 5A, 5B:
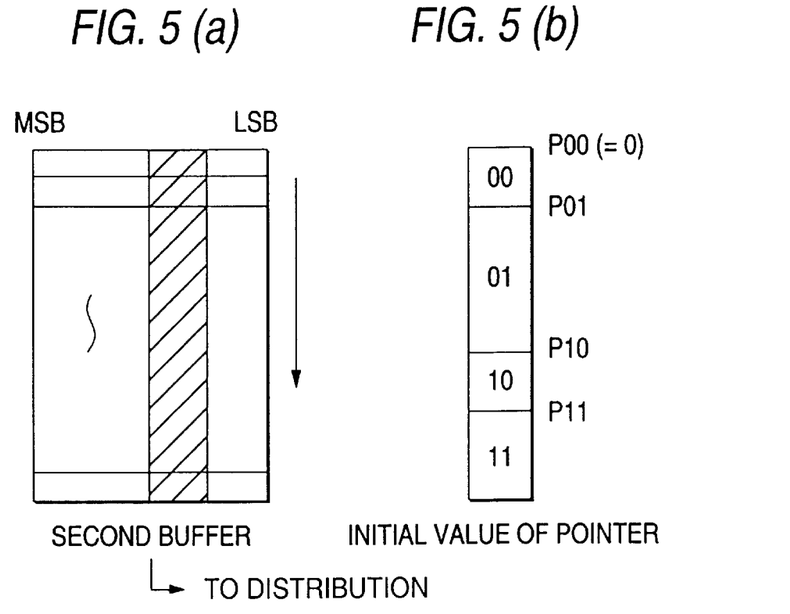
FIG. 5(a) illustrates a memory map of the second buffer in connection with the integer permutation processing having a second element as a key according to the preferred embodiment of the present invention.
FIG. 5(b) illustrates a memory map of the initial values of the pointer in connection with the integer permutation processing with a second element as a key shown in FIG. 5(a)
Figure 5C:
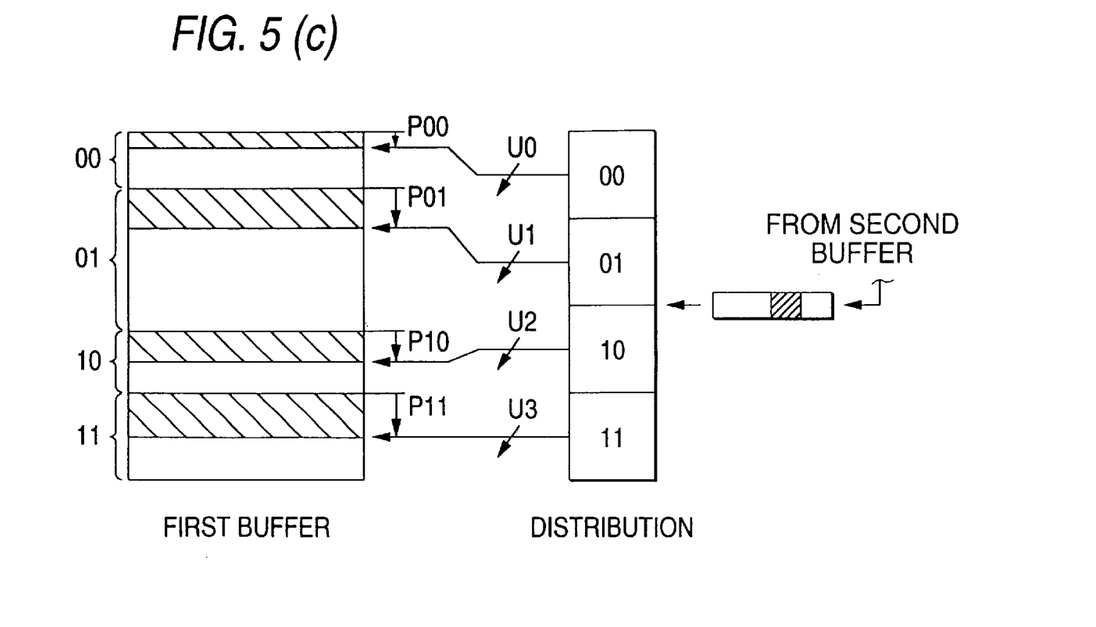

In the processing, the pointer section 12C is selected and the pointer P00–P11 corresponding to the second element is output through the switch SW1. FIG. 5(b) illustrates the pointers P00–P11. The switch circuit 30 connects the output terminal of the address counter 60 to the address terminal ADR of the second buffer 2, the read data terminal RD of the second buffer 2 to the write data terminal WD of the first buffer 1, and the switch SW2 to the address terminal ADR of the first buffer 1. That is, in contrast to the integer permutation processing with the first element as a key, data is written into the buffer 1 and read from the buffer 2. In such a connection state, integer permutation processing with the second element as a key is executed.

As in the integer permutation processing with the first element as a key, the address counter 60 up counts. The data pieces in the storage areas of addresses 0–99 of the second buffer 2 are read in sequence (FIG. 5(b)). The read data pieces are given through the switch circuit 30 to the digit place sort section 22 and the write data terminal WD of the first buffer 1 in sequence.

The digit place sort section 22 determines the value of the second element of the data read from the second buffer 2 (FIG. 5(b)) and switches the SW2 according to the determination result. Resultantly, the pointer corresponding to the value of the second element is given through the switch SW2 and the switch circuit 30 to the address terminal ADR of the first buffer 1. The data given to the write data terminal WD of the first buffer 1 at the point in time is written into the storage area addressed by the pointer. The pointer used for the addressing is incremented by one (FIG. 5(c)), as described above.

The processing is executed for 100 data pieces in the second buffer 2 and a data sequence resulting from performing the integer permutation with the second elements as keys is provided in the storage areas of addresses 0–99 in the first buffer 1.

Integer permutation processing with the third and fourth elements as keys is also performed according to similar procedures to those described above and a data sequence resulting from integer permutation in the magnitude order is provided.

Thus, according to the embodiment, the total storage capacity of the buffers used for performing integer permutation processing needs only to be a capacity as large as twice the number of data pieces to be processed, so that a small-scale configuration can be adopted.

C. Other Modifications

We have discussed the embodiment of the invention, but the scope of the invention is not limited to it and, for example, the following modifications are possible:

(1) Modification of circuit for setting pointers P00–P11 (FIG. 2)

In FIG. 2, the OR gates 127 and 129 are deleted and output signals of the AND gates 113 and 114 are supplied directly to the OR gates 128 and 130. That is, the up-counters 122, 123, and 124 count the number of data pieces with the element value "00," the number of data pieces with the element value "01," and the number of data pieces with the element value "10." Adders are provided following the up-counters 123 and 124. The counts of the up-counters 122 and 123 are added and output as pointer P01 and the count of the up-counter 124 is added to the value of the pointer P01 and output as pointer P11. Such a configuration would enable the same operation as in the embodiment.

(2) Although the embodiment uses two physically separate buffers of the first and second buffers, the storage area of one memory may be divided into two portions for use as the first and second buffers.

(3) In the embodiment, each data piece to be processed is divided into four equal pieces and integer permutation is executed with 2-bit elements as keys, but the data piece may be divided into elements consisting of a different number of bits.

(4) The components of the embodiment may be provided by software. The components to be put into software may be selected in response to the purposes of integer permutation, required processing speed, etc.

D. Application Examples of the Invention

The invention can be applied to a wide range of applications requiring integer permutation processing; particularly it can prove its worth in application where it is necessary to perform integer permutation of a large amount of data in a short time. For example, when three-dimensional image display is produced in an image processing field, a method of drawing image data of objects in sequence from the farthest object to the nearest object in overlap relation is available. To perform such control, image data corresponding to the objects is previously integer-permuted with the coordinate values on the axis in the depth direction of the screen (Z axis) as keys. This processing is so-called Z sort. The number of data pieces to which the Z sort is applied is generally large and moreover processing must be completed in a comparatively short time. The system according to the invention can also be sufficiently applied to the Z sort.

As we have discussed, the invention produces the effect of being capable of executing integer permutation processing of a large number of data pieces without using large-capacity storage means. Also, it has advantages of the configuration easily provided by hardware and easy integer permutation processing procedures appropriate for high-speed processing.

What is claimed is:

1. An integer permutation method for performing integer permutation of a plurality of data pieces each consisting of a plurality of elements, said method comprising the steps of:

a. executing an input process of storing said plurality of data pieces in storage means;

b. by determining element values in said plurality of data pieces for each element, in a data sequence which will result from performing integer permutation of said plurality of data pieces with elements as keys, finding addresses of top data pieces of data pieces having the corresponding element of each value for each value and setting the addresses as initial values of pointers each provided corresponding to each value of the corresponding element;

c. selecting the elements in order from low-order to high-order elements, and for each of the elements selected in order, executing:

c1. a process of reading said plurality of data pieces in sequence from said storage means;

c2. a process of determining the value of the corresponding element in said plurality of data pieces and storing each data piece in a storage area in said storage means addressed by the pointer corresponding to the value; and c3. a process of incrementing the pointer used for addressing the data piece.

2. An integer permutation method for performing integer permutation of a plurality of data pieces each consisting of a plurality of elements, said method comprising the steps of:

a. executing an input process of storing said plurality of data pieces in storage means;

b. determining element values in said plurality of data pieces for each element, totalizing the number of data pieces having the corresponding element of the corresponding value for each value of the corresponding element, in a data sequence which will result from performing integer permutation of said plurality of data pieces with the elements as keys, finding addresses of top data pieces of data pieces having the corresponding element of each value for each value based on the totalization result, and setting the addresses as initial values of pointers each provided corresponding to each value of the corresponding element;

c. selecting the elements in order from low-order to high-order elements, and for each of the elements selected in order, executing:

c1. a process of reading said plurality of data pieces in sequence from said storage means;

c2. a process of determining the value of the corresponding element in said plurality of data pieces and storing each data piece in a storage area in said storage means addressed by the pointer corresponding to the value; and     c3. a process of incrementing the pointer used for addressing the data piece.

3. An integer permutation system for performing integer permutation of a plurality of data pieces each consisting of a plurality of elements, said system comprising:

means for storing said plurality of data pieces;

dividing means for determining element values in said plurality of data pieces for each element;

a plurality of pointers each provided for each value of each element;

dividing analysis means, by determining element values in said plurality of data pieces for each element, in a data sequence which will result from performing integer permutation of said plurality of data pieces with elements as keys, for finding addresses of top data pieces of data pieces having the corresponding element of each value for each value and setting the addresses in the pointers each corresponding to each value of the corresponding element as initial values; and integer permutation means for selecting the elements in order from low-order to high-order elements, and for each of the elements selected in order, executing:

a process of reading said plurality of data pieces in sequence from said storage means;

a process of determining the value of the corresponding element in said plurality of data pieces and storing each data piece in a storage area in said storage means specified by the pointer corresponding to the value; and     a process of incrementing the pointer used for specification of the storage area of the data piece.

4. The integer permutation system as claimed in claim 3 wherein said storage means is made up of first and second buffers, and wherein said integer permutation means executes the processes while transferring said plurality of data pieces between the first and second buffers alternately.

* * * * *